(12) United States Patent
Barraclough et al.

(10) Patent No.: US 8,458,674 B2
(45) Date of Patent: Jun. 4, 2013

(54) METHOD AND APPARATUS FOR HANDLING EXCEPTIONS DURING BINDING TO NATIVE CODE

(75) Inventors: Gavin Barraclough, Manchester (GB); Kit Man Wan, Manchester (GB); Abdul Rahman Hummaida, Salford (GB)

(73) Assignee: International Business Machines Corporation, Armonk, NY (US)

( * ) Notice: Subject to any disclaimer, the term of this patent is extended or adjusted under 35 U.S.C. 154(b) by 1674 days.

(21) Appl. No.: 11/820,480

(22) Filed: Jun. 19, 2007

(65) Prior Publication Data

US 2008/0005724 A1 Jan. 3, 2008

(30) Foreign Application Priority Data

Jun. 20, 2006 (GB) .................... 0612149.5

(51) Int. Cl.
 *G06F 9/44* (2006.01)
 *G06F 9/45* (2006.01)
(52) U.S. Cl.
 USPC ........................ 717/138; 717/131; 717/137
(58) Field of Classification Search
 None
 See application file for complete search history.

(56) References Cited

U.S. PATENT DOCUMENTS

| | | | |
|---|---|---|---|
| 6,314,560 B1 | 11/2001 | Dunn et al. | |
| 6,321,377 B1 | 11/2001 | Beadle et al. | |
| 6,789,181 B1 * | 9/2004 | Yates et al. | 712/4 |
| 6,810,476 B2 * | 10/2004 | McGrath et al. | 712/228 |
| 6,895,579 B2 * | 5/2005 | Lueh | 717/131 |
| 6,907,519 B2 | 6/2005 | Desoli | |
| 6,934,832 B1 * | 8/2005 | Van Dyke et al. | 712/244 |

(Continued)

FOREIGN PATENT DOCUMENTS

| | | |
|---|---|---|
| EP | 1316882 | 6/2003 |
| GB | 0612149.5 | 6/2006 |

(Continued)

OTHER PUBLICATIONS

Li et al., "JET—Exception Checking in the Java Native Interface", 2011 ACM, OOPSLA'11, Oct. 22-27, 2011, Portland, Oregon, USA, pp. 1-13; <http://dl.acm.org/citation.cfm?id=2048066.2048095&coll=DL&dl=GUIDE&CFID=174032729&CFTOKEN=83806895>.*

(Continued)

*Primary Examiner* — Thuy Dao
*Assistant Examiner* — Ben C Wang
(74) *Attorney, Agent, or Firm* — James L. Baudino; Matthew B. Talpis

(57) ABSTRACT

A target computing system performs program code conversion from subject code, executable by a subject computing architecture, into target code executable by the target computing system, and then executes the target code. The target system handles exceptions during binding to native code. Native code binding executes a portion of native code in place of translating a portion of the subject code into the target code. Upon an exception during execution of the portion of native code, the target system saves a target state representing a current point of execution for the portion of native code, and creates a subject state representing an emulated point of execution in the subject architecture. A subject exception handler handles the exception with reference to the subject state. Upon resuming execution from the exception using the subject state, the saved target state is restored to resume execution in the section of portion of native code.

48 Claims, 8 Drawing Sheets

U.S. PATENT DOCUMENTS

| | | | |
|---|---|---|---|
| 7,047,394 B1* | 5/2006 | Van Dyke et al. | 717/138 |
| 7,065,633 B1* | 6/2006 | Yates et al. | 712/227 |
| 7,111,290 B1* | 9/2006 | Yates et al. | 717/158 |
| 7,254,806 B1* | 8/2007 | Yates et al. | 717/138 |
| 7,962,900 B2* | 6/2011 | Barraclough et al. | 717/128 |
| 8,020,154 B2* | 9/2011 | Barraclough et al. | 717/131 |
| 8,121,828 B2* | 2/2012 | Yates et al. | 717/138 |
| 2002/0032718 A1 | 3/2002 | Yates et al. | |
| 2002/0092002 A1 | 7/2002 | Babaian et al. | |
| 2002/0100030 A1 | 7/2002 | Souloglou et al. | |
| 2004/0181653 A1* | 9/2004 | McGrath et al. | 712/228 |
| 2005/0015758 A1 | 1/2005 | North | |
| 2005/0015781 A1 | 1/2005 | Brown et al. | |
| 2005/0086650 A1* | 4/2005 | Yates et al. | 717/138 |
| 2006/0253691 A1* | 11/2006 | Barraclough et al. | 712/244 |
| 2006/0277532 A1* | 12/2006 | Barraclough et al. | 717/137 |
| 2007/0294675 A1* | 12/2007 | Barraclough et al. | 717/137 |
| 2008/0005724 A1* | 1/2008 | Barraclough et al. | 717/138 |
| 2008/0263342 A1* | 10/2008 | Knowles et al. | 712/244 |
| 2009/0204785 A1* | 8/2009 | Yates et al. | 711/205 |
| 2009/0210649 A1* | 8/2009 | Wan et al. | 711/170 |
| 2011/0264867 A1* | 10/2011 | Wan et al. | 711/147 |

FOREIGN PATENT DOCUMENTS

| | | |
|---|---|---|
| JP | 2000322269 | 11/2000 |
| JP | 2003196107 | 7/2003 |
| WO | WO-00/22521 A3 | 4/2000 |
| WO | WO-2004/095264 A3 | 11/2004 |
| WO | WO-2004/097631 A3 | 11/2004 |
| WO | WO-2005/006106 A3 | 1/2005 |
| WO | WO-2005/008478 A3 | 1/2005 |
| WO | WO-2006/103395 A3 | 10/2006 |

OTHER PUBLICATIONS

Czajkowski et al., "Automated and Portable Native Code Isolation", Apr. 2001, Sun Microsystem, Inc., pp. 1-15; <http://labs.oracle.com/techrep/2001/smli_tr-2001-96.pdf>.*

Szegedi et al., "Dynamic Slicing of Java Bytecode Programs", 2005 IEEE, SCAM'05, pp. 1-10; <http://ieeexplore.ieee.org/stamp/stamp.jsp?tp=&arnumber=1541156>.*

International Search Report from International Application No. PCT/GB2007/050343 mailed Sep. 24, 2007.

UK Search Report for GB0711837.5 issued Oct. 22, 2007.

* cited by examiner

METHOD AND APPARATUS FOR HANDLING EXCEPTIONS DURING BINDING TO NATIVE CODE

CROSS REFERENCE TO RELATED APPLICATIONS

This application claims the benefit of U.K Patent Application No. GB0612149.5. filed Jun. 20, 2006, which is hereby incorporated by reference in its entirety.

FIELD OF THE INVENTION

The present invention relates generally to the field of computers and computer systems and, more particularly, to the handling of exception signals.

BACKGROUND OF THE INVENTION

The central processing unit (CPU) or processor lies at the heart of all modern computing systems. The processor executes instructions of a computer program and thus enables the computer to perform useful work. CPUs are prevalent in all forms of digital devices in modern life and not just in dedicated computing machines such as personal computers, laptops and PDAs. Microprocessors appear in everything from automobiles to cellular telephones to children's toys.

A problem arises in that program code which is executable by one type of processor often cannot be executed in any other type of processor, because each type of processor has its own unique Instruction Set Architecture (ISA). Hence, program code conversion has evolved to automatically convert program code written for one type of processor into code which is executable by another type of processor, or to optimise an old, inefficient piece of code into a newer, faster version for the same type of processor. That is, in both embedded and non-embedded CPUs, there are predominant ISAs for which large bodies of software already exist that could be "accelerated" for performance or "translated" to other processors that present better cost/performance benefits. One also finds dominant CPU architectures that are locked in time to their ISA and cannot evolve in performance or market reach. This problem applies at all levels of the computing industry, from stand-alone pocket-sized computing devices right through to massive networks having tens or hundreds of powerful servers.

As background information in this field of program code conversion, PCT publication WO2000/22521 entitled "Program Code Conversion", WO2004/095264 entitled "Method and Apparatus for Performing Interpreter Optimizations during Program Code Conversion", WO2004/097631 entitled "Improved Architecture for Generating Intermediate Representations for Program Code Conversion", WO2005/006106 entitled "Method and Apparatus for Performing Adjustable Precision Exception Handling", and WO2006/103395 entitled "Method and Apparatus for Precise Handling of Exceptions During Program Code Conversion", which are all incorporated herein by reference, disclose methods and apparatus to facilitate program code conversion capabilities as may be employed in the example embodiments discussed herein.

One particular problem area concerns the handling of exception signals. An exception is a condition that changes the normal flow of control in a program. An exception signal indicates that a condition has occurred somewhere within the system that requires the attention of the processor and usually needs to be handled before processing can continue. Exceptions can be subdivided into various different types such as interrupts, faults, traps or aborts. The terminology varies between different architectures, and particular types or categories of exceptions may be unique to particular architectures.

Exception signals (often simply called "signals" or "exceptions") may be raised by hardware or by software. Hardware exception signals include resets, interrupts, or signals from a memory management unit. As examples, exceptions may be generated by an arithmetic logic unit or floating-point unit for numerical errors such as divide-by-zero, for overflow or underflow, or for instruction decoding errors such as privileged, reserved, trap or undefined instructions. Software exceptions vary greatly across various different software programs but generally are applied to any kind of error checking which alters the normal behaviour of the program.

A signal handler is a special unit which is called upon when an exception signal occurs during the execution of a program. The signal handler then attempts to deal with whatever circumstances gave rise to the exception and, if possible, continue execution of the program. If the program does not provide a signal handler for a given signal then a default system signal handler will be called.

The most common events that trigger exception signals are when a process tries to (i) access an unmapped memory region or (ii) manipulate a memory region for which it does not have the correct permissions. Other common events that trigger exception signals are (iii) receipt of a signal sent from another process, (iv) execution of an instruction that the current process does not have the privilege level to execute, or (v) an Input/Output event in the hardware.

Some representative exception signals are described in Table 1. From the perspective of the computing system, each type of signal has a corresponding signal number which is usually an integer number #1, #2, #3, etc. Also, as shown in the table, it is common for each signal to have a memorable symbolic name.

TABLE 1

Example Exception Signals

| SigNum | Signal | Description |
|---|---|---|
| #1 | SIGHUP | "Hangup" - commonly used to indicate to a process that its configuration has changed, and that it should re-read its config file. |
| #2 | SIGINT | "Interrupt" - usually means Ctrl-C has been pressed by the user. |
| #3 | SIGILL | "Illegal Instruction" - the processor generates this when an invalid instruction opcode is encountered. |
| #4 | SIGTRAP | "Breakpoint" - often used by debuggers. |
| #5 | SIGBUS | "Bus Error" - usually generated by the processor to indicate an invalid memory access. This is usually an access to an unallocated or unaligned memory address. |

TABLE 1-continued

Example Exception Signals

| SigNum | Signal | Description |
|---|---|---|
| #6 | SIGSEGV | "Segmentation Violation" - generated by the processor when a user process has tried to do something not permissible in user mode. For example, trying to execute a privileged instruction, or trying to write to part of the kernel memory would both raise this signal. |
| #7 | SIGALRM | "Alarm Clock" - a process can make an alarm( ) system call, which requests the delivery of this signal n seconds later. |
| #8 | SIGTERM | "Terminate" - polite request for a program to think about exiting, if it's not too inconvenient. |
| #9 | SIGQUIT | "Quit" - Firm request for a program to exit, now please! |
| #10 | SIGKILL | "Die" - immediately terminates the process. This signal cannot be intercepted by a signal handler. |

Exception signals can come from two sources: (1) directly from an executing program or (2) from the operating system or another process. Some exception signals are generated as a direct result of an instruction executed by the program. For example, if a program executes an illegal opcode, then SIGILL is raised. Similarly, if the program attempts an illegal memory access then SIGSEGV is raised. These are referred to as in-band signals. Exception signals can also be generated externally, either by the operating system or by another process. SIGHUP and SIGALRM are examples of these. These externally generated exception signals are called out-of-band signals.

From a program's point of view, an exception signal can occur at any time. When an exception signal occurs, the operating system interrupts the execution of the signalled program and invokes a signal handler. The operating system usually defines default signal handlers for all exceptions which receive the exception signals by default and either take predefined actions or simply ignore the signal. However, the operating system maintains a process-specific handling table which maps each type of signal to a registered signal handler. For example, in Unix, a program can override a default signal handler by invoking a sigaction( ) system call. Sigaction( ) allows the program to specify what action the operating system should take when a particular exception signal is received. The action can be: (1) ignore the exception signal; (2) call the default signal handler; or (3) call a specialized signal handler function, whose address is provided by the program. Other options that can be specified when making the sigaction( ) call include which other signals are blocked during execution of a signal handler, in much the same way as a CPU can mask certain interrupts.

A Unix signal handler is typically provided with one of two prototypes. The first signal handler prototype is "void sigHandler(int sigNum)." The first argument is the number of the exception signal, so that one function can be registered to handle multiple signals. A program can request that more information be provided to the signal handler by calling sigaction( ) with the SA_SIGINFO flag. In this case, the Unix signal handler prototype becomes "void sigHandler(int sigNum, siginfo_t sigInfo, void *context)."

The second parameter ("siginfo") is a structure which contains information about the signal, including some indication of what caused the signal and where it came from. For example, in the case of a SIGILL signal, the siginfo structure contains the address of the illegal instruction. This data can be essential to allow the process to handle the signal properly. The third parameter ("context") provides access to the processor state (including all registers) at the time the signal was raised. Again, this data can be essential to allow correct handling of a signal. The signal handler is allowed to modify this context and, when execution is resumed, the registers are then restored to the values of the modified context.

Where the original program code (here called "subject code") has been written according to a particular type of processor (the "subject processor"), then that subject code requires a particular type of execution environment and must be supported by an appropriate mechanism for the handling of exception signals. However, under program code conversion, the subject code is instead converted into target code and is executed on a target computing system. When an exception arises, there is now a difficulty in providing an appropriate mechanism to handle the exception signals.

In the field of program code conversion, it is apparent that when an instruction is executed on a target processor and causes an exception signal to be reported, this instruction generally will not fulfil the conditions for reporting an exception to a signal handler written in subject code. Instructions are almost always performed on the target processor in a different order to the order of instructions in the corresponding block of subject code, firstly due to the differences between the instruction set of the subject processor for which the subject code was written and the target processor on which the target code is run, and secondly because of the optimisations that typically occur during program code conversion. Hence, it is relatively easy to provide a target state to a signal handler, but it is difficult and costly to obtain an accurate subject state representing an equivalent point in execution of the original subject code.

A further complication arises in that many real-world subject programs comprise multiple units of subject code. A single subject program may include a main subject executable and also make use of a number of subject libraries, some of which may be proprietary and some of which typically will be provided as part of the subject operating system. As the subject program runs, control flow passes between these different units of subject code as function calls are made to certain functions within the subject libraries.

PCT application WO2005/008478 (also published as US2005/0015781A), which is incorporated herein by reference, discloses a native binding technique for inserting calls to well-defined portions of native code, particularly native functions, during translation of subject code to target code, such that function calls in the subject program to subject code functions are replaced in target code with calls to native equivalents of the same functions. This avoids the overhead of translating the subject versions of those functions into target code. In addition, the native version may be a much more efficient implementation of the same functionality, as the native version can better exploit architectural features of the target architecture which may not be available on the subject architecture.

The native binding technique is very useful, because the native code is written or compiled directly for the target processor and hence runs very efficiently on the target processor. However, the native code—such as a generic library function—often does not maintain any overheads in the translation process, such as the work of maintaining an accurate subject state. That is, the native code is fast but generally does not perform useful tasks associated with the translation process that would normally be undertaken by the target code produced by the translator, such as maintaining an accurate subject state for reporting to a subject exception handler.

Further, the inventors have identified difficulties in relation to resuming execution of the subject program after the exception has been handled, and particularly where it is desired to resume execution of the native code.

SUMMARY OF THE INVENTION

According to the present invention there is provided an apparatus and method as set forth in the appended claims. Optional features of the invention will be apparent from the dependent claims, and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In one aspect of the present invention there is provided a computing system, comprising a target processor (of a first type), and a memory unit arranged to store a native code portion which is executable by the target processor and a plurality of subject code portions which are executable on a subject computing architecture which includes a subject processor (of a second type). Also, the computing system comprises a translator unit arranged to convert at least some of the plurality of subject code portions into target code and control execution of the target code on the target processor, including binding at least one of the subject code portions to the native code portion and invoking execution of the native code portion on the target processor, in substitution for converting the at least one subject code portion into target code. Further, an exception handler unit is arranged to respond to an exception signal arising during execution of the native code portion on the target processor by (i) saving a target state data structure in the memory unit which contains a target state representing a current point of execution in the target processor with respect to the native code portion, and (ii) generating a subject state data structure in the memory unit which contains a subject state representing an emulated point of execution on the subject computing architecture. A subject exception handler unit is arranged to handle the exception signal with reference to the subject state provided in the subject state data structure in the memory unit. A recovery unit is arranged to resume execution after the exception signal has been handled by the subject exception handler unit by restoring the target state into the target processor from the target state data structure in the memory unit using the subject state data structure, and then cause the target processor to resume execution of the native code portion according to the target state.

In another aspect of the present invention there is provided a method of handling exceptions during native binding under program code conversion from subject code executable by a subject computing architecture to target code executable by a target computing architecture. Performing native binding executes a portion of native code, usually in place of translating a portion of the subject code into the target code. When an exception occurs during execution of the native bound code, the method comprises saving a target state which represents a current point of execution in the target computing architecture for the native bound code, providing a subject state, and handling the exception with reference to the subject state, such that, upon resuming execution from the exception using the subject state, the saved target state is restored to resume execution of the native bound code.

In the example embodiments, the subject state represents a point of execution in the subject computing architecture, which is emulated by the target computing platform. Particularly, the subject state may include a stack pointer to a subject stack data structure in the memory of the target computing platform used to emulate a procedure stack (or control stack) of the subject architecture. Conveniently, the target state is saved to the subject stack, such that the subject stack pointer links to the stored target state. Further, in the example embodiments, execution of the native bound code uses the subject stack. Further still, in example embodiments the subject state includes a modified program counter which is used to redirect execution control when returning from handling the exception. In some embodiments, a recovery routine is performed which links from the subject state to the saved target state.

The exemplary embodiments are directed at a computing system which performs program code conversion, and are particularly useful in connection with a run-time translator that provides dynamic binary translation of subject program code into target code.

The present invention also extends to a translator apparatus arranged to perform the embodiments of the invention discussed herein. Also, the present invention extends to computer-readable storage medium having recorded thereon instructions which may be implemented by a computer to perform any of the methods defined herein.

At least some embodiments of the invention may be constructed, partially or wholly, using dedicated hardware. For example, the computing system of the example embodiments comprises a function-specific dedicated translator unit. Terms such as 'module' or 'unit' used herein may include, but are not limited to, a hardware device, such as a Field Programmable Gate Array (FPGA) or Application Specific Integrated Circuit (ASIC), which performs certain tasks.

Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements may be combined into fewer elements or separated into additional elements.

BRIEF DESCRIPTION OF THE DRAWINGS

The accompanying drawings, which are incorporated in and constitute a part of the specification, illustrate presently preferred implementations and are described as follows.

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein.

Figure 1:
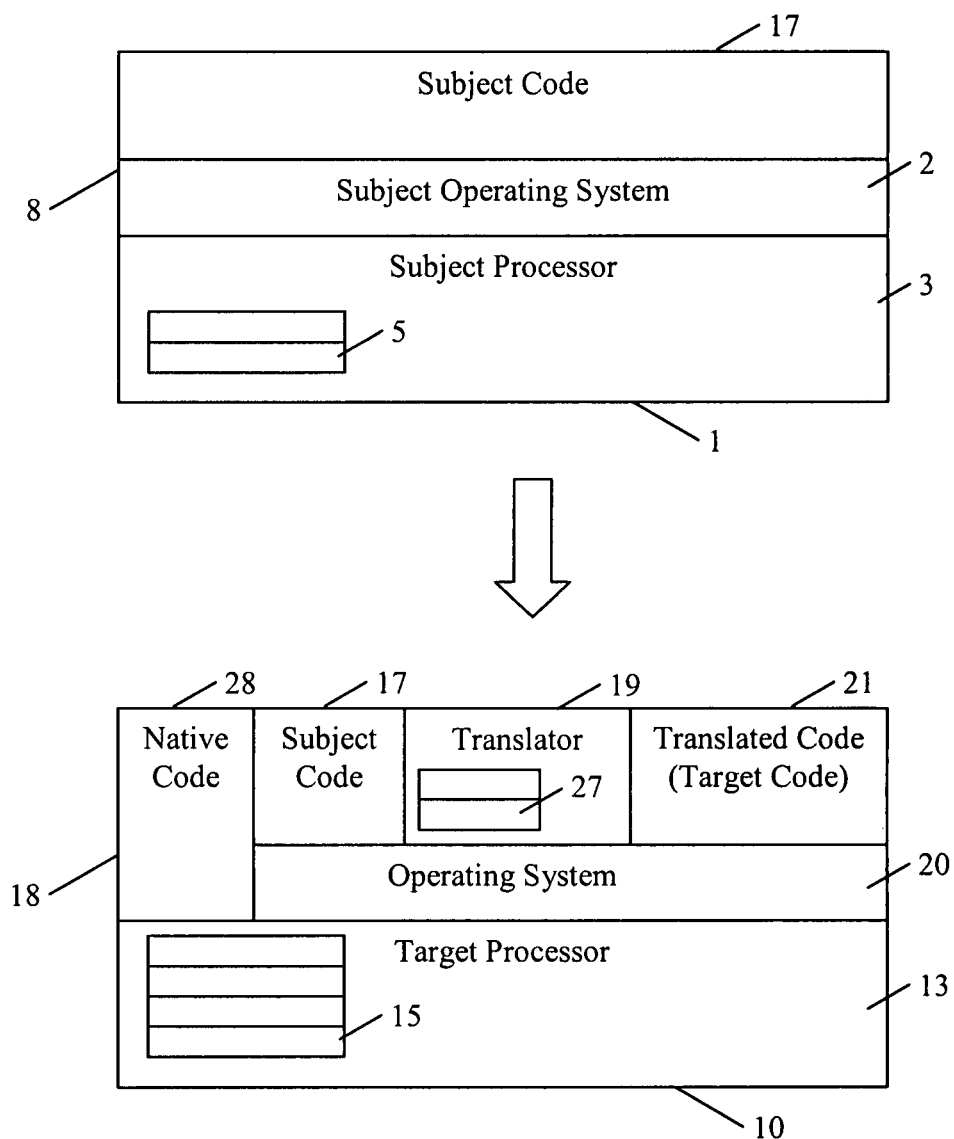
FIG. 1 is a block diagram illustrative of a computing system wherein embodiments of the invention find application.

FIG. 1 gives an overview of a system and environment where the example embodiments of the present invention may find application, in order to introduce the units, components and elements that will be discussed in more detail below. Referring to FIG. 1, a subject program 17 is intended to execute on a subject computing platform 1 having at least one subject processor 3. However, a target computing platform 10 is instead used to execute the subject program 17, through a translator unit 19 which performs program code conversion. The translator unit 19 performs code conversion from the subject code 17 to target code 21, such that the target code 21 is executable on the target computing platform 10.

As will be familiar to those skilled in the art, the subject processor 3 has a set of subject registers 5. A subject memory 8 holds, inter alia, the subject code 17 and a subject operating system 2. Similarly, the example target computing platform 10 in FIG. 1 comprises a target processor 13 having a plurality of target registers 15, and a memory 18 to store a plurality of operational components including a target operating system 20, the subject code 17, the translator code 19, and the translated target code 21. The target computing platform 10 is typically a microprocessor-based computer or other suitable computer.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

The translator code 19 is suitably a compiled version of source code implementing the translator, and runs in conjunction with the operating system 20 on the target processor 13. It will be appreciated that the structure illustrated in FIG. 1 is exemplary only and that, for example, embodiments of the invention may be implemented within or beneath the operating system 20 of the target platform. The subject code 17, translator code 19, operating system 20, and storage mechanisms of the memory 18 may be any of a wide variety of types, as known to those skilled in the art.

In the example apparatus according to FIG. 1, program code conversion is performed dynamically, at run-time, to execute on the target architecture 10 while the target code 21 is running. That is, the translator 19 runs inline with the translated target code 21. Running the subject program 17 through the translator 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject state is provided by components of the translator 19 and the target code 21. That is, the translator 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator 19, however, the global register store 27 is a data array or an object which can be accessed and manipulated at a higher level.

The term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator 19 may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture (i.e., the subject registers 5 of FIG. 1). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator 19.

FIG. 1 further shows native code 28 in the memory 18 of the target architecture 10. There is a distinction between the target code 21, which results from the run-time translation of the subject code 17, and the native code 28, which is written or compiled directly for the target architecture. Native code 28 is generated external to the translator 19, meaning that the translator 19 does not dynamically generate the native code 28 and the translator 19 does have an opportunity to modify or optimize the native code 28.

Figure 2:
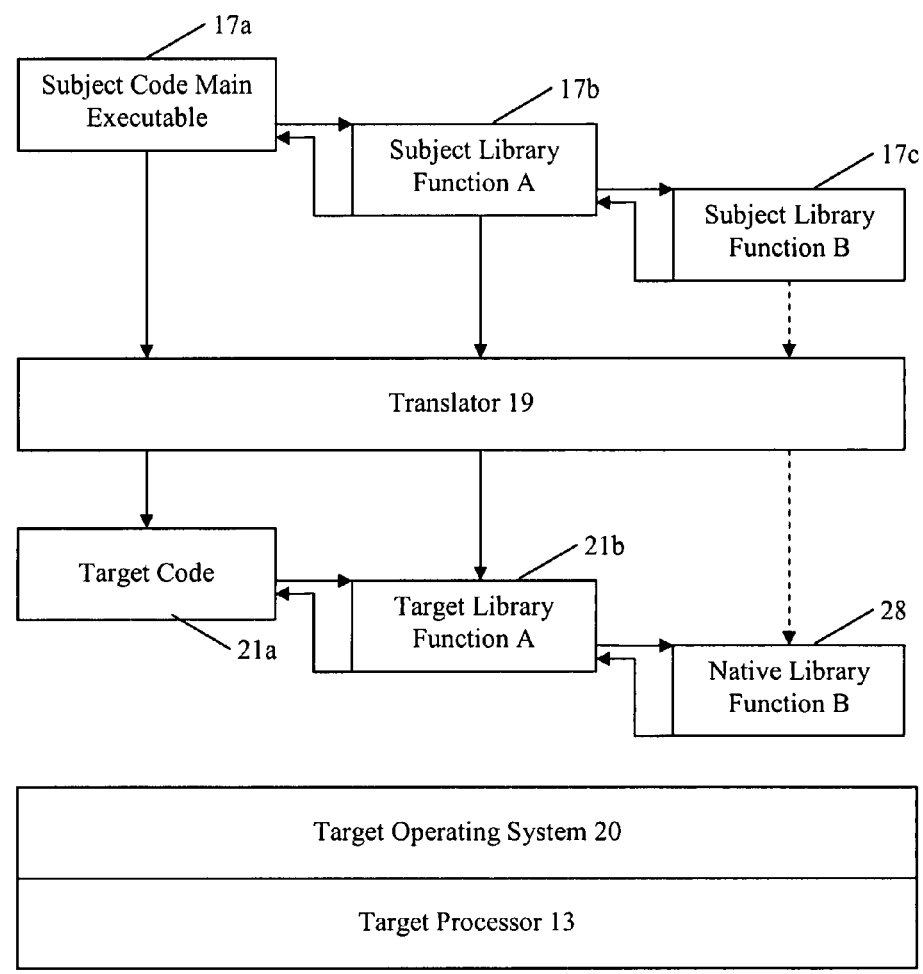
FIG. 2 is a schematic diagram illustrating a native binding mechanism as employed in embodiments of the invention.

FIG. 2 is a more detailed schematic diagram illustrating a native binding mechanism as employed in embodiments of the present invention.

Native binding is implemented by the translator 19 when it detects that the subject program's flow of control enters a section of subject code 17, such as a subject library, for which a native version of the subject code exists. Rather than translating the subject code, the translator 19 instead causes the equivalent native code 28 to be executed on the target processor 13. In example embodiments, the translator 19 binds generated target code 21 to the native code 28 using a defined interface, such as native code or target code call stubs, as discussed in more detail in WO2005/008478 (and US2005/0015781A) referenced above.

The subject program 17 usually includes one or more subject executable files 17a which are translated into target code 21a. The subject executable 17a may in turn refer to and make use of a number of subject libraries including proprietary libraries and/or system libraries. Two example library functions 17b, 17c are illustrated. The translator 19 uses native binding to replace calls to certain of the subject library functions with calls to equivalent functions in native libraries provided in the native code 28. In this example, the translator 19 has translated a first library function A into target code 21b, whereas a second library function B is native bound to a native library function in native code 28. These native libraries are typically part of the target operating system 20, but may also be provided to the target system along with the translator 19.

As an illustrative example, the translator 19 is arranged to perform a MIPS to x86 translation. Here, the x86 target system library "libc" defines an advanced native memcpy( ) (memory copy) routine that takes advantage of SSE2 vector operations to perform extremely fast byte copies. Using native binding, calls to a subject memcpy function in the MIPS subject code are bound to the native memcpy( ). This eliminates the cost of translating the subject (MIPS) version of the memcpy( ) function. In addition, the native (x86) version of the memcpy( ) is adapted to the intricacies of the native hardware, and can achieve the function's desired effect in the most efficient way for that hardware.

Native binding is primarily applicable to library functions, but may also be implemented for any well-defined section of subject code for which a native code equivalent is available in the target architecture. That is, in addition to target system library calls, native binding may be used for more arbitrary code substitution, such as substituting a natively compiled version of a non-library function. Furthermore, native binding may be used to implement subject system calls on a native architecture, by replacing all calls to subject system functions with substitute native functions that either implement the same functionality as the calls to subject system functions or act as call stubs around target system calls. Native binding may also be applied at arbitrary subject code locations, beyond function call sites, to allow arbitrary code sequences (in either target code or native code) and/or function calls to be inserted or substituted at any well-defined point in the subject program.

Figure 3:
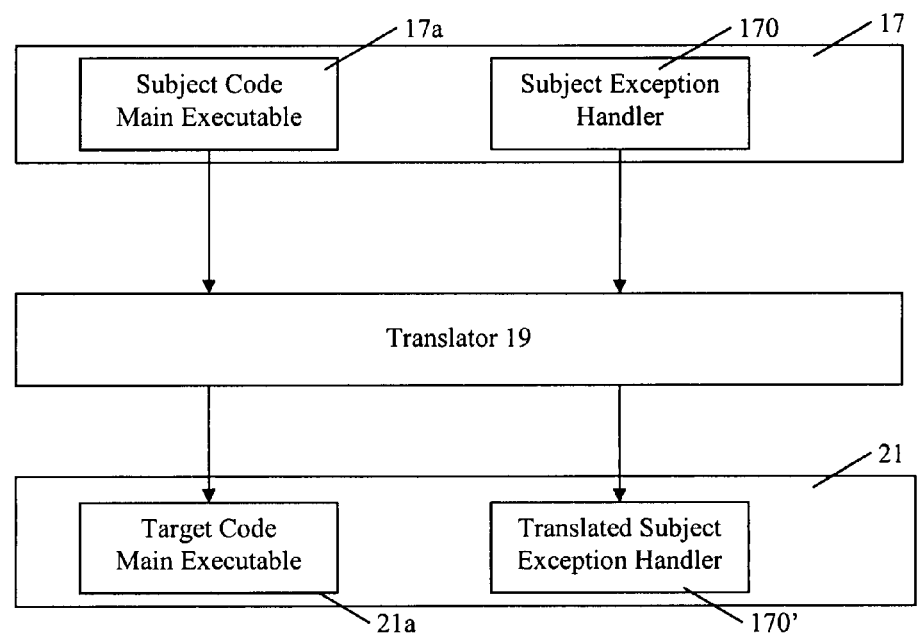
FIG. 3 is a schematic diagram showing components which are employed for the handling of exceptions by example embodiments of the present invention.
Figure 3:
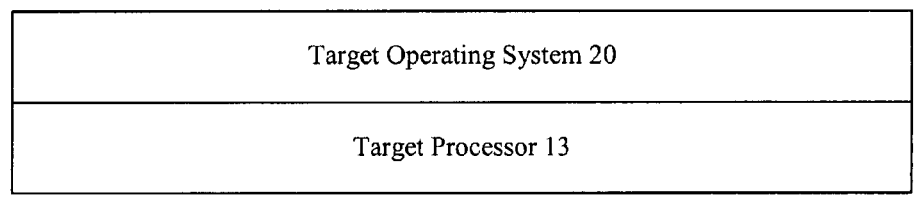

FIG. 3 is a more detailed schematic diagram of the target computing platform 10 of FIG. 1, showing components which are employed relevant to the handling of exceptions as performed by an example embodiment of the present invention.

Typically, one or more subject exception handlers 170 are provided to handle exceptions which occur during execution of the subject program 17. In the context of program code conversion, it is desirable to accurately model, on the target system, the behaviour of the subject exception handler(s) 170. Here, FIG. 3 shows a set of subject exception handlers 170, which may include specific subject exception handlers that are specific to a particular type of exception and one or more default system exception handlers to be employed where a specific exception handler is not registered. Conveniently, the subject exception handlers 170 are made available on the target platform as part of the subject code 17.

The translator 19 also provides a corresponding set of translated subject exception handlers 170' in target code 21 to execute on the target processor 13, which emulate the subject exception handlers 170. In particular embodiments, the subject exception handlers 170 are dynamically translated into executable target code versions when needed. It will be understood that reference to a subject exception handler 170 in the following description includes, where appropriate, a reference to the translated target code version of the subject exception handler.

Figure 4:
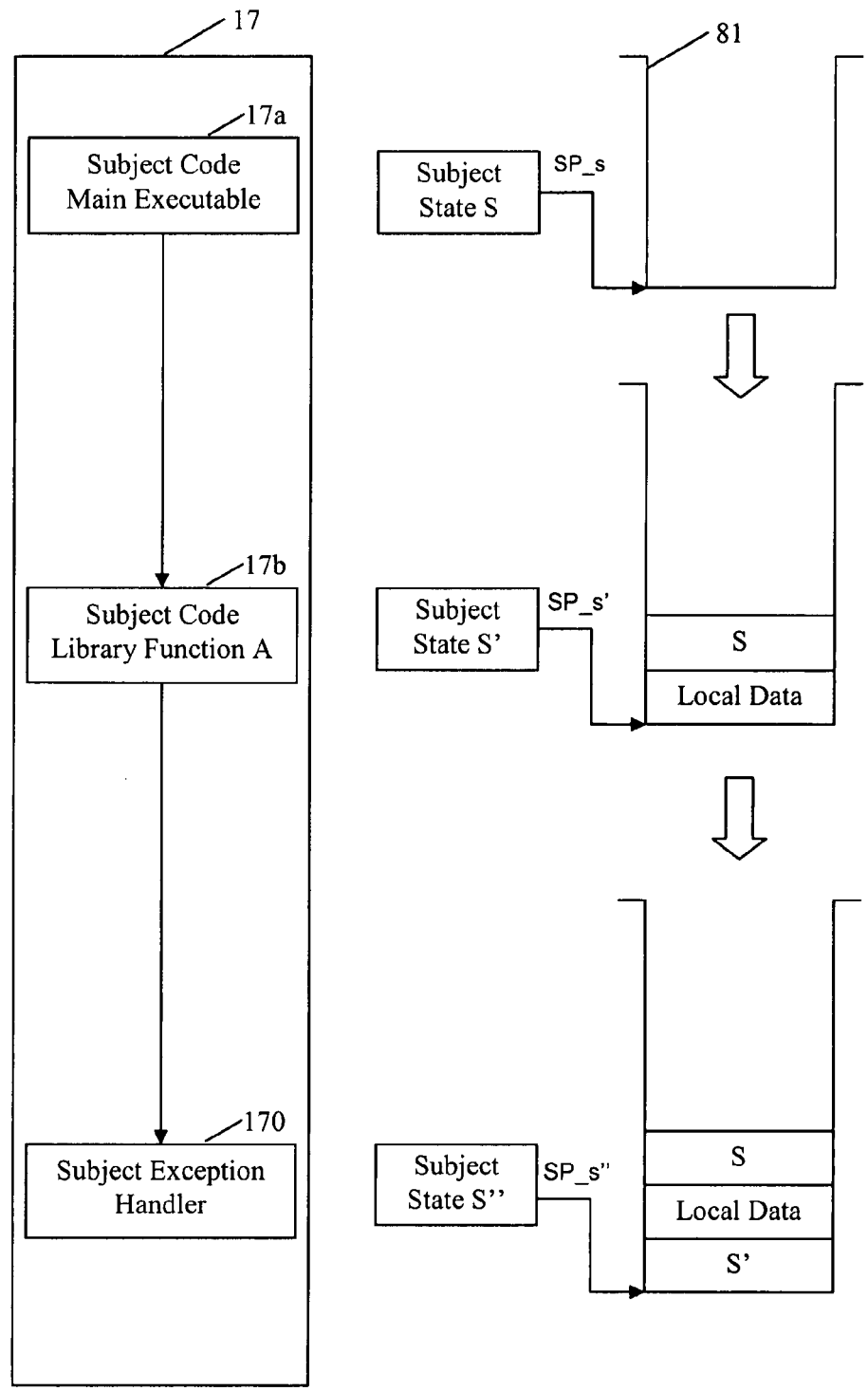
FIG. 4 is a schematic diagram showing execution in a subject computing platform when calling a subject library function and when handling an exception during execution of the library function.

FIG. 4 is a schematic diagram showing execution in the subject computing platform when calling a subject library function and when handling an exception during execution of the library function.

When an exception occurs, a current subject state is stored to a predetermined location (e.g. to a stack) and execution control passes to the appropriate subject exception handler 170. The subject exception handler 170 will often use this stored subject state information in order to handle the exception. Also, if the exception handler so determines, the subject state is used to resume execution of the subject program, either at the same point as where the exception occurred, or at some other point in the subject program. The subject exception handler may, as part of handling the exception, alter the stored subject state, such as by altering a stored program counter. Hence, in the context of program code conversion, it is desirable to accurately follow the expected behaviour of the subject exception handler 170.

As will be familiar to persons skilled in the art, in architectures which use a stack for procedure calls, a subject stack 81 stores information about the active subroutines or library functions which have been called by the subject program. Usually, the subject stack 81 is provided in the memory 8 of the subject platform 1, and many processors provide special hardware to manipulate such stack data structures in memory. The main role of the stack 81 is to keep track of the point to which each active function should return when it finishes executing, although the stack may also be used for other purposes such as to pass function parameters and results, and to store local data. Typically, each function call puts linking information on the stack, including a return address. This kind of stack is also known as an execution stack, control stack, or function stack. Usually, one stack is associated with each running program or with each task of a process. The exact details of the stack depend upon many factors including, for example, the subject hardware, the subject operating system, and the instruction set architecture of the subject platform.

In FIG. 4, the subject state S includes information such as the content of at least some of the subject registers. In particular, the subject state S may include information such as current values of a subject stack pointer (SP_S) and a subject program counter (PC_S), amongst others. When the caller subject program 17a calls a subject library function 17b, the subject state S is stored by pushing the contents of the subject registers to the subject stack 81, and the subject stack pointer SP_S is updated to point to the top of the subject stack 81. During execution of the called library function 17b, local data may be stored on the subject stack 81 and a new subject state S' is formed. When an exception occurs, the new subject state S' is stored on the stack 81, and execution passes to the subject execution handler 170. After handling the exception, the subject platform will be in a third state S". In this example, the second stored state S' is recovered from the stack after handling the exception, and execution resumes at the point in the subject library function 17b where the exception occurred. Later, the first stored state S is recovered when execution returns from the library function 17b to the caller program 17a.

Figure 5:
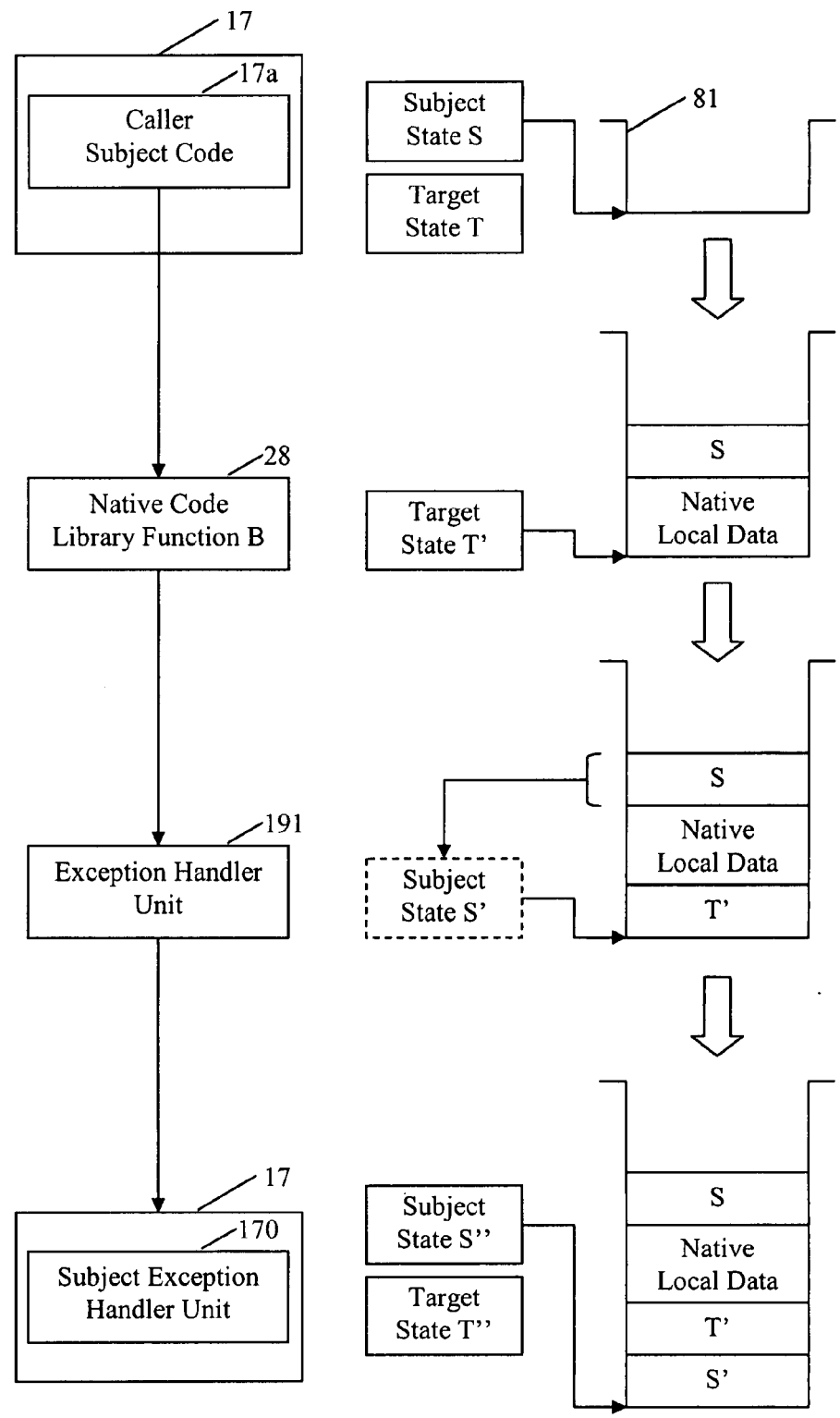
FIG. 5 is a schematic diagram showing execution in a target computing platform when performing native binding and when handling an exception in native bound code, as employed in embodiments of the present invention.

FIG. 5 is a schematic diagram showing a state of execution in the target computing platform when performing native binding and when handling an exception in native bound code, as employed in embodiments of the present invention. In particular, FIG. 5 illustrates an example embodiment of the present invention which allows a useful subject state S' to be reported to the subject exception handler 170, and also allows execution to resume in the native bound code 28.

For program code conversion as discussed herein, the translator 19 provides elements on the target platform 10 which are, in general terms, functionally equivalent to those on the subject platform 1. In this example, the translator 19 provides a representation of the subject stack 81 in the target memory 18, and represents the subject registers 5 using the abstract register bank 27. Hence, the translator 19 is able to emulate all of the structures shown in FIG. 4 when the subject code 17a calls the subject library function 17b and when an exception is handled in the subject exception handler 170. However, when performing native binding, the translator 19 no longer has close control over the native bound code 28 and the translator 19 cannot maintain a subject state S' which remains precisely equivalent to the subject state during execution of the subject library function 17c on the subject platform. However, the embodiments discussed herein allow the translator 19 to provide an appropriate equivalent of the second subject state S' to the subject exception handler 170. Further, the embodiments discussed herein allow execution control to return to the native bound code 28 after the exception has been handled.

In FIG. 5, the target platform 10 has a target state T which represents information such as a target program counter and a target stack pointer, and the current state of the target registers 15 in the target processor 13. Initially, the target state T reflects the execution of target code 21 produced by the translator 19 from the caller subject program 17a. Execution of the target code 21 causes a subject state S to be provided on the target platform, as discussed above.

The native binding technique is employed to execute a native code library function B, and the first target state T evolves to a second target state T' during execution of the native bound code 28. When an exception occurs during execution of the native bound code 28, an exception signal is raised (i.e. by the target OS 20) and passed to the registered exception handler. As part of handling the exception, the target state T' is saved to an appropriate storage location in the target system, in this case to the subject stack 81. This second target state T' represents a current point of execution in the target processor 13 for the native bound code 28, at the point when the exception occurred. Also, an exception handler unit 191 of the translator 19 creates and stores a subject state S', before passing execution control to the subject exception handler 170. The subject execution handler 170 is invoked to handle the exception with reference to the created subject state S'. Here, the second subject state S' comprises at least a subject stack pointer (SP_S) pointing to the subject stack 81 above the saved target state T'. Conveniently, the previously saved subject state S is used as a foundation for the second subject state S', with a modification to include the required new value of the subject stack pointer (SP_S).

Execution of the subject exception handler 170 results in a third subject state S" and a third target state T" (due to the work done on the target platform to handle the exception). However, the subject exception handler 170 is now able to refer to the saved subject state S' in order to resume execution in the native bound code 28 at the point where the exception occurred. That is, the saved subject state S' owns the saved target state T' and resuming execution of the subject code at the saved subject state S' resumes execution of the native bound code 28.

It is useful to note that, in this illustrated embodiment, the first and third target states T and T" refer to execution of the target code 21 produced by the translator 19 from the relevant subject code 17. In this embodiment, execution of the target code 21 uses a target stack (not shown) also provided in the memory of the target platform separately from the subject stack 81. By contrast, the second target state T' refers to execution of the native code 28 using the subject stack 81. Hence, the second target state T' is shown to include a stack pointer (here illustrated with an arrow) which points to the subject stack 81, whilst the first and third target states do not.

As shown in FIG. 5, the example embodiments of the present invention use the subject stack 81 for execution of the native bound code 28. As discussed above, the subject stack 81 is a designated area of the memory 18, which the translator 19 manages on behalf of the subject code 17 as part of the subject code to target code translation. Using the subject stack 81 for execution of the native code 28 prevents the native context T' being lost as a result of servicing an exception during execution of that native bound code. In particular, the subject stack 81 is preserved when executing the translated version of the subject exception handler 170. As a further advantage, using the subject stack 81 for native binding execution allows environment switches in the subject code 17 to be dealt with transparently, such as by executing library calls similar to a "longjmp" function. A longjmp function restores a subject stack and subject state previously saved by calling a setjmp. This provides a way to execute a non-local "go to" type instruction and is typically used to pass execution to recovery code from the subject exception handler 170.

Therefore, by using the subject stack 81 for native binding, resources can be reclaimed transparently if the subject code 17 calls a longjmp. As part of the translation of the subject longjmp function, the translated code resets the subject stack pointer SP_S to reclaim stack space allocated by the native binding mechanism.

In some alternate embodiments of the present invention, execution of the native code 28 may employ a different stack elsewhere in the memory 18 of the target platform 10, such as a stack of the translator 19 (translator stack) or a separately allocated native stack (not shown), instead of the subject stack 81.

Figure 6:
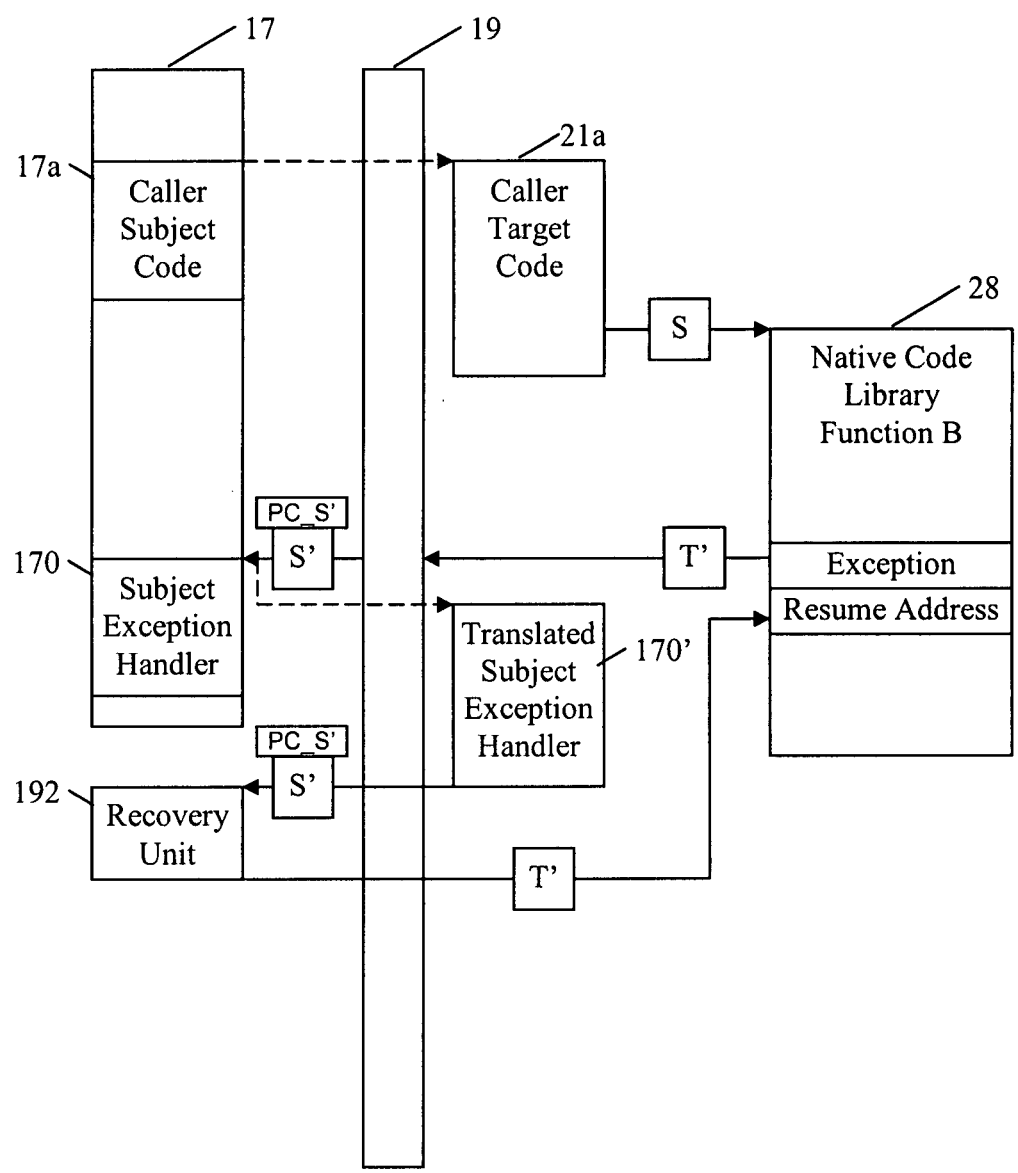
FIG. 6 is a schematic diagram showing a flow of execution control when handling an exception in native bound code, as employed in embodiments of the present invention.

FIG. 6 shows a flow of execution control when handling an exception in native bound code, as employed in embodiments of the present invention.

In FIG. 6, the caller subject code 17a (executing as caller target code 21a) calls into the native bound code 28 and an appropriate subject state S is saved on the subject stack 81 to allow a return into the caller target code 21a. An exception occurs during the native bound code 28 which, as discussed above, provides a target state T'. The native binding mechanism returns control to the translator 19 and the target state T' is saved.

As discussed above, the translator 19 generates the second subject state S'. In this aspect of the invention, the second subject state includes, inter alia, at least a subject program counter PC_S' which is specially modified by the translator 19. In particular, the specially modified subject program counter value PC_S' passed to the subject exception handler 170 does not correspond to a program address of the subject program 17. However, the subject exception handler 170 (executing as translated subject exception handler 170') may use this subject program counter PC_S' as a return address when attempting to restart execution at the point where the exception occurred.

In a first example embodiment as shown in FIG. 6, the translator 19 includes a recovery unit 192 which acts to recover the target state T' and resume execution in the native bound code. In one embodiment, the recovery unit is form by providing a reserved location 171 (see FIG. 7), such as a memory page within the translator's address space, which the translator 19 will treat as a portion of subject code 17. Thus, when the translated subject exception handler 170' attempts to pass control to the program location identified by the specially modified subject program counter PC_S', the translator 19 is directed to the reserved location 171. In this first embodiment, the reserved location 171 contains subject code instructions which, when translated and executed as target code, cause the target state T' to be recovered such that the native bound code 28 resumes execution. Here, restoring the target state T' suitably includes filling the target registers with the saved version of their previous contents, such as popping these values from the subject stack 81.

In a second example embodiment as also illustrated by FIG. 6, the reserved location 171 contains special case instructions which do not fall within the instruction set of the subject architecture. Instead, the translator 19 recognises these special case instructions and in response executes a recovery routine to recover the stored target state T' and allow the native code 28 to resume. Here, the recovery routine is suitably provided as part of the translator code 19.

In another example embodiment, the program counter PC_S' passed in the subject state S' is a predetermined notional value (such as 0X000000) which does not correspond to a real location in the memory of the target architecture. The translator 19 is configured to recognise this special program counter and, instead of passing control to the identified location, redirects the flow of execution to execute the recovery routine 171 which loads the stored target state T' and allows the native code 28 to resume. This particular embodiment relies on the translator 19 to detect when the subject program counter is a given predetermined value and to take a different action.

Referring again to FIGS. 5 and 6, in the example embodiments discussed herein the first subject state S is employed in creating the second subject state S'. Suitably, the first subject state S is saved when the native code 28 is called, and hence the first subject state S is available to populate the second subject state S' when an exception occurs. That is, the old subject state S is copied forward to become the new subject state S', except that the program counter PC_S is modified to the special value PC_S', and/or the stack pointer is updated to the new head of the subject stack 81. This mechanism provides the subject exception handler 170 with a workable subject state S' sufficient to handle the exception. The subject exception handler 170 may, for example, examine the subject program counter PC_S to determine where within the subject program the exception occurred. The subject handler 170 may then determine how to deal with the exception. The subject exception handler 170 is usually written in a manner which makes some assumptions about the program address space of the subject code program 17 and any dynamically allocated memory. However, the subject exception handler 170 usually cannot assume the memory areas where other components of the system, such as library functions, will reside. Where the subject program counter PC S' reported to the subject exception handler 170 lies outside the address range allocated to the subject code 17, the subject exception handler 170 cannot make detailed decisions based on the supposed state of the subject platform and will therefore handle the exception similar to the manner in which it would have been handled on the subject platform.

Figure 7:
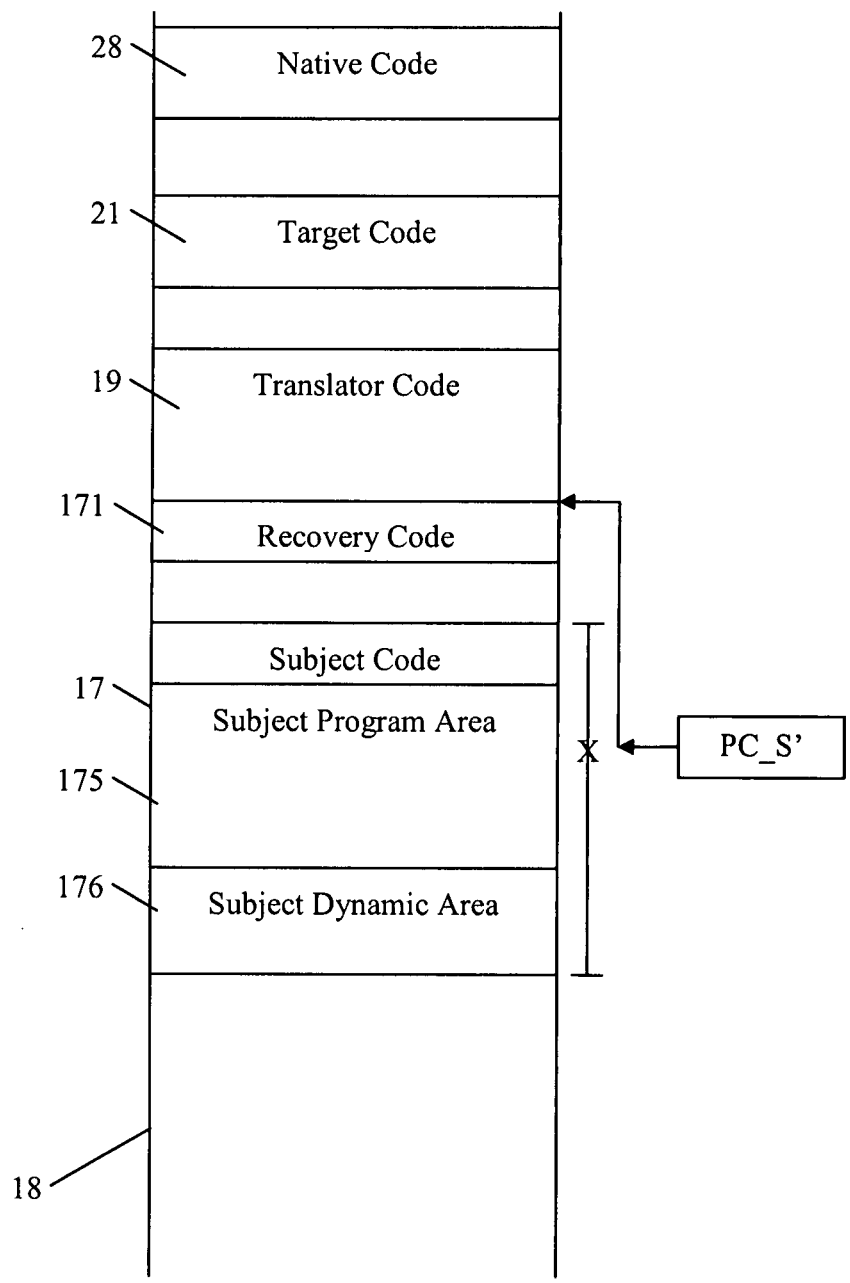
FIG. 7 is a schematic diagram of a portion of the memory of the target computing platform.

FIG. 7 is a schematic diagram of a portion of the memory of the target platform. As shown in FIG. 7, the subject program 17 is allocated a subject program area 175 in the target memory 18, alongside other components such as the translator code 19 and the target code 21. This subject program area 175 typically comprises a linear range of virtual addresses, which map to one or more sets of physical storage locations as will be familiar to persons skilled in the art. The modified program counter PC_S' passed to the subject exception handler 170 suitably lies outside this subject program area 175. Further, the subject program may have one or more dynamically allocated memory areas 176 such as for working storage, and the modified program counter PC_S' also suitably falls outside the dynamically allocated subject areas 176.

Figure 8:
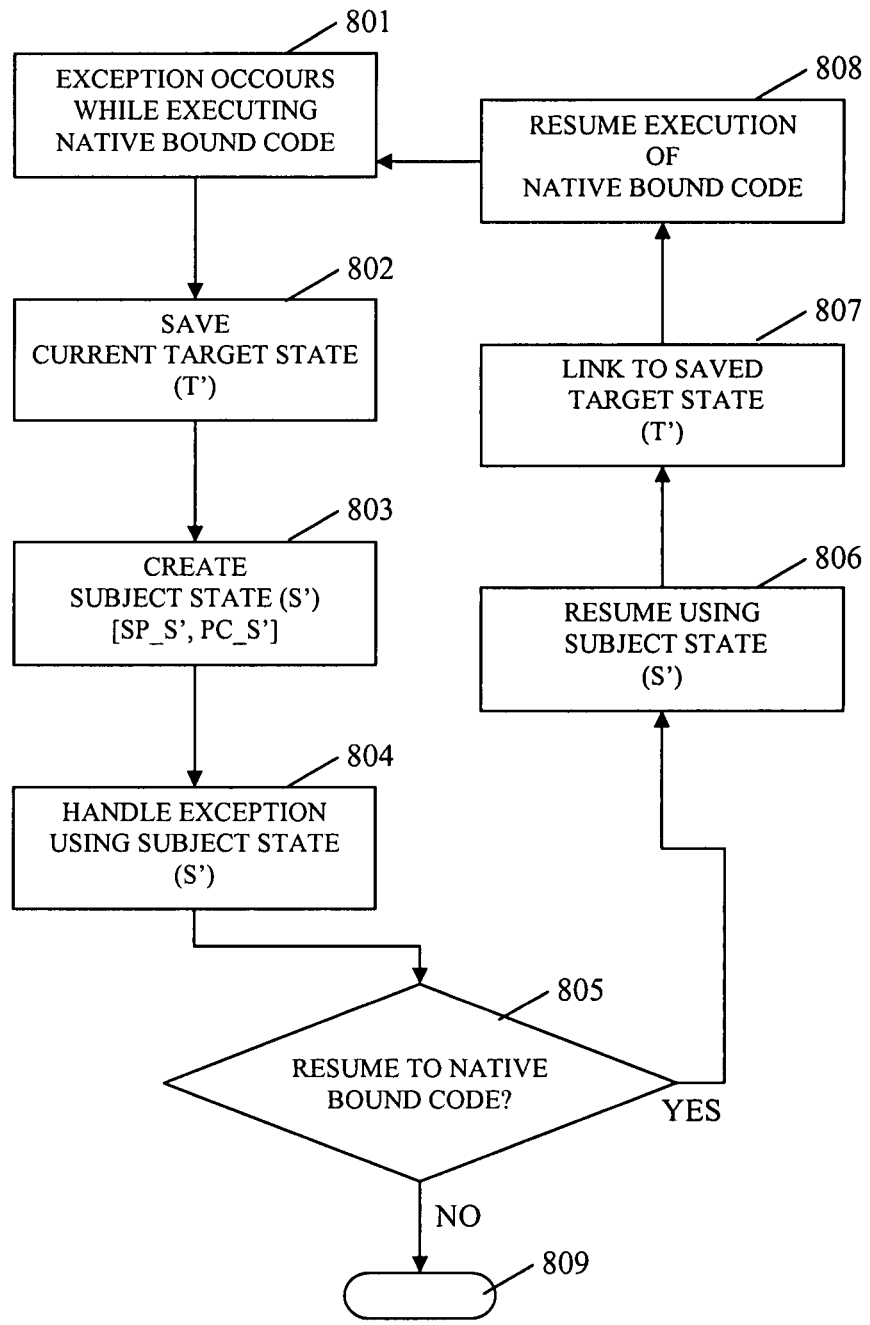
FIG. 8 is a schematic flow diagram illustrating a method of handling exceptions for native bound code as employed by example embodiments of the present invention.

FIG. 8 is a schematic flow diagram illustrating a method of exception handling for native bound code as employed by example embodiments of the present invention.

As discussed above, an exception occurs during execution of native bound code (step 801). A current execution state is saved (step 802), reflecting execution of the native bound code on the target platform (target state T'). Also, a subject state (S') is created (step 803) reflecting an emulated point of execution on the subject platform, as if the exception had occurred whilst executing subject code on the subject platform. In particular, the created subject state S' includes a stack pointer SP_S' to the subject stack, where the target state T' is conveniently stored. Also, the subject state S' includes a specially modified program counter PC_S' as discussed above. The exception is handled with reference to the created subject state S' (step 804). The subject exception handler 170 will include instructions which determine (step 805) whether or not to resume execution at the point where the exception occurred (i.e. return to the previous point of execution, which in this case lies in the native bound code). In some circumstances, execution of the subject program is halted, or control passes to a different portion of the program (step 809). However, where it is determined to resume execution at the point where the exception occurred, execution is resumed using the created subject state S' (step 806) which links to the saved target state T' (step 807) to resume execution of the native bound code (step 808).

In summary, the mechanisms and embodiments described herein have many advantages, including that exceptions occurring during native bound code are handled reliably and efficiently. In the example embodiments, storing the target state T' linked by the subject state S' allows execution of bound native code 28 to be resumed after handling an exception. Also, by modifying the subject program counter in the manner described above, the subject exception handler 170 can return control to the native code 28 by directly or indirectly performing the recovery function 171 which loads the stored target state T'. Further, using the subject stack 81 for execution of the native code 28 maintains the subject stack in good order and allows resources to be released efficiently. These and other features and advantages will be apparent to the skilled person from the above description and/or by practicing the described embodiments of the present invention.

Although a few example embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of handling an exception signal in a computing system, comprising the steps of:
  (a) performing program code conversion to convert subject code executable by a subject computing architecture into target code executable by the computing system;
  (b) executing a portion of native code which is native to the computing system in substitution for translating a portion of the subject code into the target code;
  (c) in response to an exception signal arising during execution of the portion of native code, performing the steps of:
    (i) saving a target state which represents a current point of execution in the computing system with respect to the native code portion;
    (ii) generating a subject state which represents an emulated point of execution in the subject computing architecture, wherein the subject state comprises a link to the target state; and
    (iii) handling the exception signal with reference to the subject state; and
  (d) resuming execution from the exception signal by using the link in the subject state to restore the target state, and then using the target state to resume execution of the native code portion.

2. The method of claim 1, wherein the step (d) comprises executing a recovery routine to restore the target state.

3. The method of claim 1, wherein the subject state includes a modified subject program counter and the method further comprises passing execution control to the modified subject program counter thereby executing a recovery routine to load the target state and return execution control to the portion of native code.

4. The method of claim 3, wherein the modified subject program counter has a predetermined value and the method further comprises detecting the predetermined value and redirecting execution control to execute the recovery routine.

5. The method of claim 1, wherein the subject state includes a modified subject program counter, and the method further comprises providing a reserved location to be treated as a portion of the subject code at an address identified by the modified subject program counter.

6. The method of claim 5, wherein the reserved location contains subject code instructions and the method comprises translating and executing the subject code instructions as target code, thereby to recover the target state and resume execution of the portion of native code.

7. The method of claim 5, wherein the reserved location contains special case instructions which do not fall within an instruction set architecture of the subject computing architecture, and the method comprises detecting the special case instructions and in response executing a recovery routine to recover the saved target state and resume execution of the portion of native code.

8. The method of claim 5, comprising using the modified subject program counter as a return address after handling the exception, when attempting to restart execution of the subject code at a point where the exception occurred, such that execution control passes to the reserved location.

9. The method of claim 1, further comprising the steps of:
  converting a caller portion of the subject code into target code and forming a first subject state including at least a subject program counter;
  calling the portion of native code from the caller portion of target code; and
  copying and modifying the first subject state to form the subject state.

10. The method of claim 1, further comprising providing a subject stack data structure in a memory of in the target computing system for emulating execution of the subject code on the subject computing architecture.

11. The method of claim 10, further comprising executing the portion of native code using the subject stack.

12. The method of claim 11, further comprising storing the subject state on the subject stack prior to handling the exception whereby the stored subject state is available from the subject stack after handling the exception.

13. The method of claim 12, wherein the step of saving the target state comprises saving values of a set of registers of a target processor of the target computing system onto the subject stack, and the method further comprises restoring the target state including loading the saved values from the subject stack into the set of registers.

14. The method of claim 11, further comprising saving the target state on the subject stack prior to handling the exception whereby the target state is available from the subject stack after handling the exception.

15. The method of claim 1, further comprising handling the exception signal and determining to resume execution of the subject code at a point where the exception occurred using the subject state, or to resume execution of the subject program at another point in the subject code by altering a subject program counter in the subject state.

16. A computing system, comprising:
a target processor of a first type;
a memory unit arranged to store a native code portion which is executable by the target processor and a plurality of subject code portions which are executable on a subject computing architecture which includes a subject processor of a second type;
a translator unit arranged to convert at least some of the plurality of subject code portions into target code and control execution of the target code on the target processor, including binding at least one of the subject code portions to the native code portion and invoking execution of the native code portion on the target processor, in substitution for converting the at least one subject code portion into target code;
an exception handler unit arranged to respond to an exception signal arising during execution of the native code portion on the target processor by (i) saving a target state data structure in the memory unit which contains a target state representing a current point of execution in the target processor with respect to the native code portion, (ii) generating a subject state data structure in the memory unit which contains a subject state representing an emulated point of execution on the subject computing architecture, and (iii) creating in the subject state data structure a link to the target state data structure;
a subject exception handler-unit arranged to handle the exception signal with reference to the subject state provided in the subject state data structure in the memory unit; and
a recovery unit arranged to resume execution after the exception signal has been handled by the subject exception handler unit by restoring the target state into the target processor from the target state data structure in the memory unit using the link in the subject state data structure, and then cause the target processor to resume execution of the native code portion according to the target state.

17. The computing system of claim 16, wherein the recovery unit is arranged to cause the target processor to execute a recovery routine to restore the target state into the target processor.

18. The computing system of claim 16, wherein the exception handler unit is arranged to create the subject state data structure including a modified subject program counter, and the recovery unit is arranged to pass execution control according to the modified subject program counter such that the target processor executes a recovery routine to load the target state and return execution control to the native code portion.

19. The computing system of claim 18, wherein the modified subject program counter has a predetermined value and the recovery unit is arranged to detect the predetermined value and redirect the target processor to execute the recovery routine.

20. The computing system of claim 16, wherein the subject state data structure includes a modified subject program counter, and the memory unit further comprises a reserved location to be treated as a portion of the subject code at an address identified by the modified subject program counter.

21. The computing system of claim 20, wherein the reserved location in the memory unit contains subject code instructions and the recovery unit causes the translator unit to translate the subject code instructions into target code for execution by the target processor, thereby to recover the target state and resume execution of the native code portion.

22. The computing system of claim 20, wherein the reserved location contains special case instructions which do not fall within an instruction set architecture of the subject computing architecture, and the recovery unit is arranged to detect the special case instructions and in response cause the target processor to execute a recovery routine to recover the saved target state and resume execution of the native code portion.

23. The computing system of claim 20, wherein the recovery unit causes the translator unit to use the modified subject program counter as a return address after handling the exception, when attempting to restart execution of the subject code at a point where the exception occurred, such that execution control passes to the reserved location.

24. The computing system of claim 16, wherein the translator unit is arranged to convert a caller subject code portion into a caller target code portion thereby forming a first subject state including at least a subject program counter;
wherein execution of the caller target code portion on the target processor calls from the caller target code portion to the native code portion; and
the exception handling unit is arranged to copy and modifying the first subject state to form the subject state for recordal in the subject state data structure.

25. The computing system of claim 16, wherein the memory unit further comprises a subject stack data structure for emulating execution of the subject code portions on the subject computing architecture.

26. The computing system of claim 25, wherein the target processor is arranged to execute the native code portion using the subject stack data structure.

27. The computing system of claim 25, wherein:
the exception handling unit is arranged to store the subject state on the subject stack data structure prior to handling the exception; and
the recovery unit is arranged to obtain the subject state from the subject stack data structure after handling of the exception by the subject exception handling unit.

28. The computing system of claim 25, wherein:
exception handling unit is arranged to save the target state on the subject stack data structure prior to handling of the exception by the subject exception handling unit; and
the recovery unit is arranged to obtain the target state from the subject stack data structure after handling of the exception by the subject exception handling unit.

29. The computing system of claim 28, wherein:
the exception handling unit is arranged to save the target state comprising values of a set of registers of the target processor into the subject stack data structure; and
the recovery unit is arranged to restore the target state into the target processor including loading the saved values from the subject stack data structure into the set of registers.

30. The computing system of claim 16, wherein the subject exception handling unit is arranged to handle the exception including determining to resume execution at a point where the exception occurred using the subject state, or to resume execution at another point in a subject program by altering a subject program counter in the subject state to create a modified subject program counter.

31. A method of handling an exception in a target computing platform, comprising the steps of:
converting subject code executable by a subject computing platform into target code executable by the target computing platform, including converting a caller portion of subject code into a caller portion of target code;
executing the caller portion of target code thereby generating on the target computing platform a first target state relating to execution of the target code and emulating a first subject state representing execution of the caller portion of subject code on the subject computing platform;
calling from the caller portion of target code to a portion of native code which is native to the target computing platform;
executing the portion of native code on the target computing platform thereby generating a second target state and, where an exception occurs during execution of the portion of native code, saving the second target state and generating a second subject state based on the first subject state wherein the second subject state comprises a link to the second target state; and
handling the exception with reference to the second subject state and using the second subject state to link to the second target state to thereby resume execution in the portion of native code.

32. The method of claim 31, further comprising the step of executing of a recovery routine to restore the second target state when resuming execution from the exception.

33. The method of claim 31, wherein the second subject state comprises a modified subject program counter and the method further comprises passing execution control to the modified subject program counter, loading a recovery routine to load the saved second target state, and thereby returning execution control to the portion of native code.

34. The method of claim 33, wherein the modified subject program counter has a predetermined value and the method further comprises detecting the predetermined value and redirecting execution control to the recovery routine.

35. The method of claim 31, wherein the second subject state comprises a modified subject program counter, and the method further comprises providing a reserved location treated as a portion of the subject code at an address identified by the modified subject program counter.

36. The method of claim 35, wherein the reserved location contains subject code instructions and the method comprises converting and executing the subject code instructions as target code thereby causing recovery of the saved target state whereby the portion of native code resumes execution.

37. The method of claim 35, wherein the reserved location contains special case instructions which do not fall within an instruction set architecture of the subject computing platform, and the method comprises detecting the special case instructions and in response executing a recovery routine to recover the saved second target state thereby enable execution of the portion of native code to resume.

38. The method of claim 35, comprising using the modified subject program counter as a return address after handling the exception, when attempting to restart execution at a point where the exception occurred, whereby execution control passes to the reserved location.

39. The method of claim 31, wherein the first subject state comprises at least a subject program counter, and wherein generating the second subject state comprises copying the first subject state to form the subject state and modifying the subject program counter to a modified value.

40. The method of claim 31, further comprising providing a subject stack data structure in the target computing platform for emulating execution of the subject code on the subject computing platform.

41. The method of claim 40, further comprising executing the portion of native code with reference to the subject stack.

42. The method of claim 40, further comprising storing at least the second subject state on the subject stack prior to handling the exception, such that the stored second subject state is available from the subject stack after handling the exception.

43. The method of claim 40, further comprising saving at least the second target state on the subject stack prior to handling the exception, such that the saved second target state is available from the subject stack after handling the exception.

44. The method of claim 43, wherein the step of saving the second target state comprises saving values of a set of target registers of a target processor of the target computing platform onto the subject stack, and the method further comprises restoring the second target state including loading the saved values from the subject stack into the set of target registers.

45. The method of claim 31, further comprising handling the exception and determining to resume execution at a point where the exception occurred using the subject state, or to resume execution of the subject program at another point in the subject code by altering a subject program counter in the subject state.

46. A translator apparatus arranged to handle exception signals during binding to native code, comprising:
a memory; and
a processor coupled to the memory and operable to execute:
a translator unit arranged to convert subject code executable by a subject computing platform into target code executable by a target computing platform, and arranged to cause the target computing platform to execute a portion of native code which is native to the target computing platform in substitution for converting a portion of the subject code into the target code, and further wherein the translator unit is arranged to convert caller subject code into caller target code for execution by the target computing platform to provide a first target state and a first subject state and to cause at least the first subject state to be saved when calling into a portion of the native code from the caller target code;
an exception handler unit arranged to detect an exception signal raised during execution of the native code, cause the saving of a second target state which represents a current point of execution in the target computing platform for the native code, and provide a second subject state, wherein the second subject state comprises a link to the second target state;
a subject exception handler unit arranged to handle the exception with reference to the second subject state; and a recovery unit arranged to cause the target computing platform to resume execution of the native code by linking to the second target state from the second subject state.

47. A non-transitory computer-readable medium having recorded thereon instructions implementable by a computer to perform a method of handling an exception signal, comprising the steps of:
   (a) performing program code conversion to convert subject code executable by a subject computing architecture into target code executable by a target computing architecture;
   (b) executing a portion of native code which is native to the target computing architecture in substitution for translating a portion of the subject code into the target code;
   (c) in response to an exception signal arising during execution of the portion of native code, performing the steps of:
      (i) saving a target state which represents a current point of execution in the target computing architecture with respect to the native code portion;
      (ii) generating a subject state which represents an emulated point of execution in the subject computing architecture. wherein the subject state comprises a link to the target state; and
      (iii) handling the exception signal with reference to the subject state; and
   (d) resuming execution from the exception by using the link in the subject state to restore the target state, and then using the target state to resume execution of the native code portion.

48. A non-transitory computer-readable medium having recorded thereon instructions implementable by a computer to perform a method of handling an exception, comprising the steps of:
   converting subject code executable by a subject computing platform into target code executable by a target computing platform, including converting a caller portion of subject code into a caller portion of target code;
   executing the caller portion of target code thereby generating on the target computing platform a first target state relating to execution of the target code and emulating a first subject state representing execution of the caller portion of subject code on the subject computing platform;
   calling from the caller portion of target code to a portion of native code which is native to the target computing platform;
   executing the portion of native code on the target computing platform thereby generating a second target state and, where an exception occurs during execution of the portion of native code, saving the second target state and generating a second subject state based on the first subject state wherein the second subject state comprises a link to the second target state; and
   handling the exception with reference to the second subject state and using the second subject state to link to the second target state to thereby resume execution in the portion of native code.

\* \* \* \* \*